United States Patent
Forbes

(10) Patent No.: US 7,444,285 B2
(45) Date of Patent: Oct. 28, 2008

(54) METHOD AND SYSTEM FOR SEQUENTIAL INSERTION OF SPEECH RECOGNITION RESULTS TO FACILITATE DEFERRED TRANSCRIPTION SERVICES

(75) Inventor: Joseph S. Forbes, Austin, TX (US)

(73) Assignee: 3M Innovative Properties Company, Saint Paul, MN (US)

( * ) Notice: Subject to any disclaimer, the term of this patent is extended or adjusted under 35 U.S.C. 154(b) by 821 days.

(21) Appl. No.: 10/313,353

(22) Filed: Dec. 6, 2002

(65) Prior Publication Data

US 2004/0111265 A1 Jun. 10, 2004

(51) Int. Cl.
*G10L 15/26* (2006.01)

(52) U.S. Cl. ............ 704/235; 704/270; 379/88.01

(58) Field of Classification Search ............ 704/235, 704/270; 379/88.01
See application file for complete search history.

(56) References Cited

U.S. PATENT DOCUMENTS

| | | | |
|---|---|---|---|
| 4,975,957 A | 12/1990 | Ichikawa et al. | |
| 5,649,060 A | 7/1997 | Ellozy et al. | 295/2.87 |
| 5,668,928 A | 9/1997 | Groner | |
| 5,799,273 A | 8/1998 | Mitchell et al. | 704/235 |
| 5,960,384 A | 9/1999 | Brash | |
| 5,960,447 A | 9/1999 | Holt et al. | 707/500 |
| 6,122,614 A | 9/2000 | Kahn et al. | 704/235 |
| 6,172,675 B1 | 1/2001 | Ahmad et al. | 345/328 |
| 6,219,644 B1 | 4/2001 | VanBuskirk | |
| 6,266,635 B1 | 7/2001 | Sneh | |
| 6,298,326 B1 | 10/2001 | Feller | 704/270 |
| 6,360,237 B1 * | 3/2002 | Schulz et al. | 715/531 |
| 6,490,553 B2 * | 12/2002 | Van Thong et al. | 704/211 |
| 6,513,003 B1 * | 1/2003 | Angell et al. | 704/235 |
| 6,535,848 B1 * | 3/2003 | Ortega et al. | 704/235 |
| 6,813,603 B1 | 11/2004 | Groner et al. | |
| 6,834,264 B2 | 12/2004 | Lucas et al. | |
| 6,865,258 B1 * | 3/2005 | Polcyn | 379/88.01 |
| 6,912,498 B2 | 6/2005 | Stevens et al. | |
| 6,990,445 B2 * | 1/2006 | Ky | 704/235 |
| 7,016,849 B2 | 3/2006 | Arnold et al. | |

(Continued)

FOREIGN PATENT DOCUMENTS

WO WO 98/43181 10/1998

OTHER PUBLICATIONS

W3C® (MIT,ERCIM, Keio); Voice Extensible Markup Language (VoiceXML) Version 2.0, Mar. 16, 2004; 2009pp; http://www.w3.org/TR/voicexml20.

(Continued)

*Primary Examiner*—Martin Lerner
(74) *Attorney, Agent, or Firm*—Steven A. Bern

(57) ABSTRACT

Methods and systems are disclosed for the sequential insertion of speech recognition results for deferred transcription services. Speech recognition results are used in the creation of resultant documents by delivering the results through a sequential insertion process. This sequential insertion process may utilize document templates and may also synchronize the delivery of the contents of speech recognition results with the audio playback of the recorded speech information. The sequential insertion process in part provides an interface more closely related to traditional methods for deferred transcription that do not utilize speech recognition. By combining the use of speech recognition with the sequential delivery of the speech recognition results, the disclosed methods and systems advantageously provide a transcription tool that enhances the efficiency of the deferred transcription process, particularly where document templates are utilized.

39 Claims, 7 Drawing Sheets

U.S. PATENT DOCUMENTS

| | | | |
|---|---|---|---|
| 2001/0005825 A1 | 6/2001 | Engelke et al. | 704/235 |
| 2002/0099717 A1 | 7/2002 | Bennett | |
| 2002/0116188 A1 | 8/2002 | Amir et al. | 704/235 |
| 2002/0143544 A1* | 10/2002 | Gschwendtner | 704/260 |
| 2002/0161578 A1* | 10/2002 | Saindon et al. | 704/235 |
| 2003/0050777 A1* | 3/2003 | Walker, Jr. | 704/235 |
| 2003/0072013 A1 | 4/2003 | Norris et al. | |
| 2004/0111265 A1 | 6/2004 | Forbes | |
| 2004/0193420 A1 | 9/2004 | Kennewick et al. | |
| 2005/0096910 A1* | 5/2005 | Watson et al. | 704/260 |
| 2005/0114129 A1* | 5/2005 | Watson et al. | 704/235 |
| 2005/0171762 A1* | 8/2005 | Ryan et al. | 704/200 |

OTHER PUBLICATIONS

21 Century Eloquence, L&H Dragon's Naturally Speaking Legal V5.0; Product Index; 2002; 3pp; http://www.voicerecognition.com/products/dragon/dnslegalv5.0.html.

Spring Medical Systems, Inc.; Using the New Office Visit Large Form—Tabs; SpringCharts™ EMR; 2001-2004; 14pp; SpringChartsEMR Tutorials V8; http://www.springmedical.com/trainingcenter/h2newovlTabs.html.

AGFA; Medical Transcription Module; QdReport; 4pp; 2004; http://agfabeint01.net.agfa.com/bu/mi/Mednet/MedNet.nsf/AllDocs/81B354E6F293D00DC1256E5200348823/$FILE/QdReport%204.0.pdf.

Nuance Communications, Inc.; Report Templates & Power Normals Enhance Productivity; Dictaphone PowerScribe®; 2006; 2 pp; http://www.dictaphone.com/products/powerscribe/psTemplates.esp.

Koninkijke Phillips Electronics N.V.; SpeechMagic™; Phillips; 2004-2006; 2pp; http://www.speedmagic.com.

Friedman, C. et al; "A General Natural-Language Text Processor for Clinical Radiology", Journal of American Medical Informatics Association, vol. 1, No. 2, Mar./Apr. 1994, pp. 161-174.

* cited by examiner

METHOD AND SYSTEM FOR SEQUENTIAL INSERTION OF SPEECH RECOGNITION RESULTS TO FACILITATE DEFERRED TRANSCRIPTION SERVICES

TECHNICAL FIELD OF THE INVENTION

This invention relates to transcription services, particularly those that generate resultant documents formatted with respect to a desired document template. More particularly, the present invention relates to such transcriptions services that utilize result files generated through the use of speech recognition processing.

BACKGROUND

The traditional method for transcribing voice dictation does not utilize speech recognition processing to facilitate the transcription process. When traditional transcription methods are used without a template, the transcriptionist opens a blank document and starts listening to the spoken input, typing the spoken words and punctuation and adding any missing punctuation as the transcriptionist proceeds. Either from memory or by reference to a sample document, the transcriptionist manually applies formatting wherever needed and reorders the recognition results, adding and/or styling the desired section headings, to produce a finished document. Things that are typically done as part of this process are (1) typing spoken words and punctuation, (2) adding missing punctuation, (3) applying formatting, (4) adding and styling section headings, and (5) ensuring proper ordering of sections.

With the use of document templates, the traditional method for transcription becomes one in which the transcriptionist loads a template into a word processor and listens to the spoken input, typing the spoken words and punctuation and adding any missing punctuation as the transcriptionist plays back the recorded speech information. As the speaker moves from section to section of the document, the transcriptionist moves within the template, ensuring that the sections of the document appear in the desired order even if the speaker dictates the sections in a different order. The template can contain default formatting for each part of the document such that when the cursor is placed in a given location, the desired formatting for that part of the document is automatically applied. This process utilizes a speaker's spoken input to generate a finished document. The main task performed during this process is the typing of the words as spoken and the addition of punctuation, which is almost always omitted or partially omitted by the speaker. In addition to the typing and punctuation tasks, the process includes the addition of formatting and text by the transcriptionist through the use of a basis document or template. Lastly, the process includes the reordering of the document's sections into a desired order. Thus, things that are typically done as part of the traditional transcription process are (1) typing spoken words and punctuation, (2) adding missing punctuation and (3) ensuring proper ordering of sections.

More recent approaches to transcription have taken advantage of speech recognition. In recent years, speech recognition software has progressed to the extent that it can be loaded on a desktop computer system and used to directly input dictated text into an electronically displayed document. As such, speech recognition can be used in a variety of approaches to improve the efficiency of business practices. One approach is for the speaker to use speech recognition software such that the speaker's speech is converted into text while the speaker is talking. This converted speech is displayed to the speaker in electronic form so that the speaker can correct and/or format the resulting text in real-time.

An alternative approach to this direct use of speech recognition and real-time correction by the speaker is for the speech information to be recorded for deferred transcription by a transcriptionist. Such deferred transcription services free the speaker or his/her staff from the task of converting the speech information into a formatted and corrected final document, and these services can utilize transcriptionists located in remote transcription centers around the world. For example, deferred transcription services headquartered within the United States have utilized transcription centers located in remote geographic locations, such as India, where labor is reasonably skilled yet lower cost than labor within the United States. Current approaches to the use of speech recognition to facilitate deferred transcription services, however, have involved the delivery of the entire text-only results of the speech recognition process, such that a transcriptionist sees the entire text-only result file at one time.

In operation, when text-only speech recognition results are used without a template, the transcriptionist opens a document containing the text and starts listening to the spoken input, following along in the text with his/her eyes. When the transcriptionist identifies a recognition error, the transcriptionist stops the playback and corrects the recognition results. The transcriptionist stops the playback periodically to add missing punctuation to the previously played sentence or sentences. Either from memory or by reference to a sample document, the transcriptionist manually applies formatting wherever needed and reorders the recognition results, adding and/or styling the desired section headings, to produce a finished document. Things that are typically done as part of this process are (1) correcting recognition errors, (2) adding missing punctuation, (3) applying formatting, (4) adding and styling section headings, and (5) ensuring proper ordering of sections.

When text results from speech recognition are used with a template, the transcriptionist either opens two documents, one containing the text results and another containing the template, or opens one document containing both the speech recognition results and the template such that the template follows the results or vice versa. The transcriptionist can then start listening to the spoken output, following along in the text results with his/her eyes. When the transcriptionist identifies a recognition error, he/she can stop the playback and correct the recognition results. In addition, the transcriptionist can stop the playback periodically to add punctuation to the previously played sentence or sentences. Either from memory or by reference to a sample document, the transcriptionist can also manually apply formatting wherever needed. Either before, concurrent with, or after the rest of this process, therefore, the transcriptionist must arrange the recognition results into the correct parts of the template. Things that are typically done as part of this process are (1) correcting recognition errors, (2) adding missing punctuation, (3) applying formatting, and (4) ensuring proper ordering of sections.

One significant problem with the above method of applying speech recognition results to facilitate deferred transcription services by delivering the entire text-only results at once is the fact that if the transcriptionist's attention wanders even for a moment, the transcriptionist can lose his/her place in the recognition results, requiring the transcriptionist to rewind the audio and find his/her place in the document. One common approach to solving this problem is to highlight each word within the entire text of the text-only results file as the corresponding part of the audio is played. This highlighting approach, however, still suffers from inefficiencies and can be particularly difficult to utilize in a document template implementation. These difficulties are particularly evident where document templates are utilized because the transcriptionist must take the recognition results that are delivered into a document and move them into appropriate template fields.

SUMMARY OF THE INVENTION

The present invention provides an improved and advantageous application of speech recognition to deferred transcription services that involves the delivery of the speech recognition results through a sequential insertion process. This sequential insertion of speech recognition results may also utilize document templates and may also synchronize the delivery of speech recognition results with the audio playback of the recorded speech information. The sequential insertion of the present invention provides in part an interface that is more closely related to traditional methods for deferred transcription that do not utilize speech recognition. By combining the use of speech recognition with a sequential insertion delivery that more closely correlates to traditional deferred dictation, the present invention advantageously provides a transcription tool that enhances the efficiency of the deferred transcription process, particularly where document templates are utilized.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides an application of speech recognition results to transcription services that involves the delivery of speech recognition results through a sequential insertion process. This sequential insertion of speech recognition results may utilize document templates and may also synchronize the delivery of speech recognition results with the audio playback of the recorded speech information. This synchronization can be accomplished, for example, through the use of time-indexed recognition results, which are recognition results that are broken into smaller results units (such as words or phrases) and that contain time index information for the portion of the audio corresponding to each results unit. The time-indexed recognition results can be provided, for example, by speech recognition software, such as the IBM VIAVOICE speech recognition engine, although any time-indexed recognition results could also be used. It is noted that other types of speech recognition result files could be used, if desired, such as result files that may not include time-indexed text but rather combine text and audio speech information into the same file.

It is further noted that deferred transcription services can include any of a variety of situations that could involve the use of sequential insertion of speech recognition results at a time that is different from the time at which the speech information is generated, including, for example, (1) where speech recognition is done at the same time that the speech information is generated and sequential insertion of the speech recognition results is used at a later time to provide deferred correction of the speech recognition results, and (2) where speech recognition is done at a subsequent time to the time that the speech information is generated and sequential insertion of the speech recognition results is used at a still later time to provide deferred correction of the speech recognition results. In addition, it is noted that speech recognition results can include any of a variety of data files that include data representing the words, phrases and/or other results that were recognized through the speech recognition process, whether or not the data file represents the initial result file output of a speech recognition engine or some modified or processed version of this information. Furthermore, it should be understood that the transcriptionists described below can be any user that desires to take advantage of the sequential insertion of speech recognition results according to the present invention.

Figure 1A:
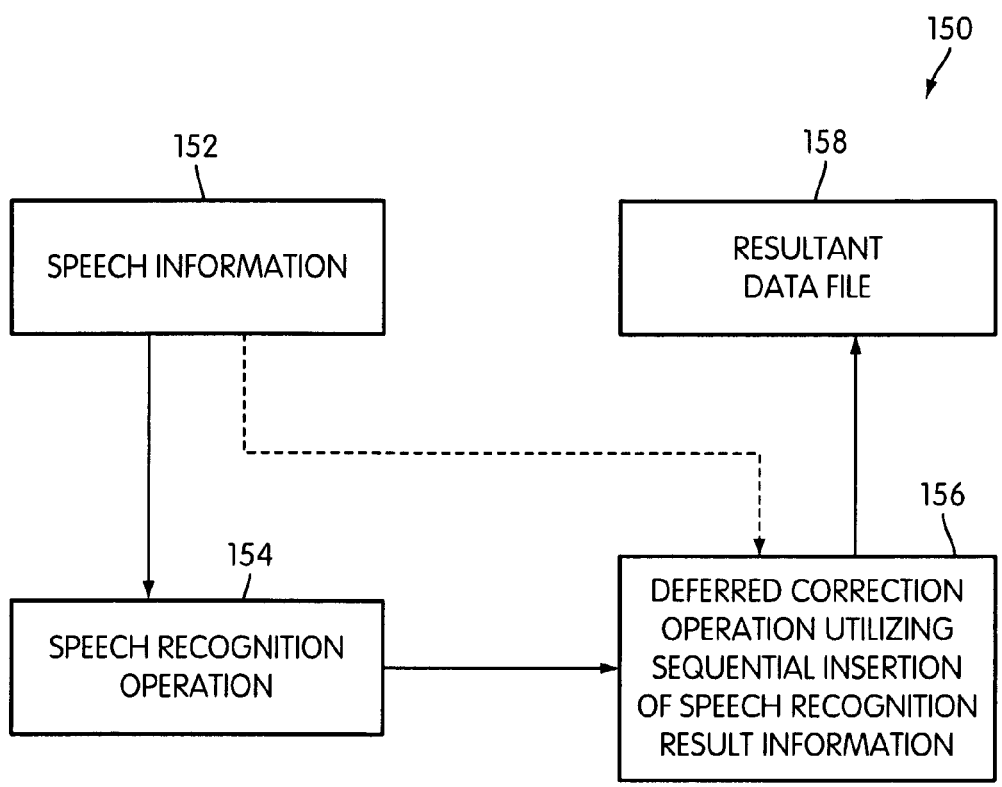
FIG. 1A is block diagram for a deferred transcription environment utilizing sequential insertion according to the present invention.

FIG. 1A is block diagram for a deferred transcription environment 150 utilizing sequential insertion according to the present invention. In the deferred transcription environment 150 shown, a speech recognition operation 154 is first performed on speech information 152. The speech recognition results are then provided to block 156 for a deferred correction operation utilizing the sequential insertion of speech recognition result information. As represented by the dotted line between block 152 and block 156, if desired, speech information 152 can also be utilized in performing the deferred correction operation of block 156. The final resultant data file 158 represents that resulting product of the deferred correction operation 156. In a general sense, therefore, the present invention facilitates deferred transcription services by utilizing results files from speech recognition processes to sequentially insert or display speech recognition results to a transcriptionist so that the transcriptionist can sequentially correct and format those results as needed. In addition, if audio playback is utilized, the sequential insertion can be synchronized with the audio playback so that the transcriptionist sequentially sees the speech recognition results synchronized with the corresponding audio speech information as it is played back. As discussed below, there are a wide variety of architectures and environments for implementing and utilizing the sequential insertion of speech recognition results to facilitate deferred transcription services according to the present invention.

In one general example utilizing sequential insertion with synchronized audio playback, the synchronization approach works by utilizing an audio playback component that can be polled for its current position within the audio playback and/or for other playback related information. During playback, for example, the transcription station used by the transcriptionist can periodically poll the audio playback component for its current position. At each polling event, any results unit in the time-indexed results that has a position between the current position and the position of the next expected polling event is inserted into the document at the current cursor position and the cursor is advanced to the end of the last inserted word. It is noted that the maximum frequency of the polling is likely to be dependent on the resolution offered by the audio playback component's response to a polling of its current position. It is further noted that the synchronization of the insertion of the text with the current position within the audio playback may be implemented as described above or it may be implemented following a variety of different rules, as desired. For example, the text may be inserted after the corresponding audio has played by inserting words at each polling whose positions are between the current polling position and the previous polling position. Further variations may also be achieved by adding or subtracting an interval to or from the current position within the audio or the position of the results units, resulting in a fixed or an adjustable "lag" or "lead" time between the audio playback and the insertion of corresponding text.

Using this approach, the transcriptionist can load a template into a word processor, place the cursor at the start of the document, and begin playback. As the transcriptionist listens to the spoken input, the speech recognition results are inserted into the document. When the transcriptionist identifies a recognition error, the transcriptionist stops the playback and corrects the recognition error. The transcriptionist stops the playback periodically to add missing punctuation. When the speaker moves from section to section of the document, the transcriptionist stops playback, deletes the results indicating to move to a different section, moves the cursor to the desired section, and restarts playback. The template contains default formatting for each part of the document such that when the cursor is placed in a given location, the desired formatting for that part of the document is automatically applied. Things that are typically done as part of this process include (1) correcting recognition errors, (2) adding missing punctuation and (3) ensuring proper ordering of sections. In practice, therefore, the sequential insertion of speech recognition results of the present invention tends to enhance the traditional approach for deferred transcription rather than replacing it with the insertion of block text-only results from speech recognition processing.

Figure 1B:
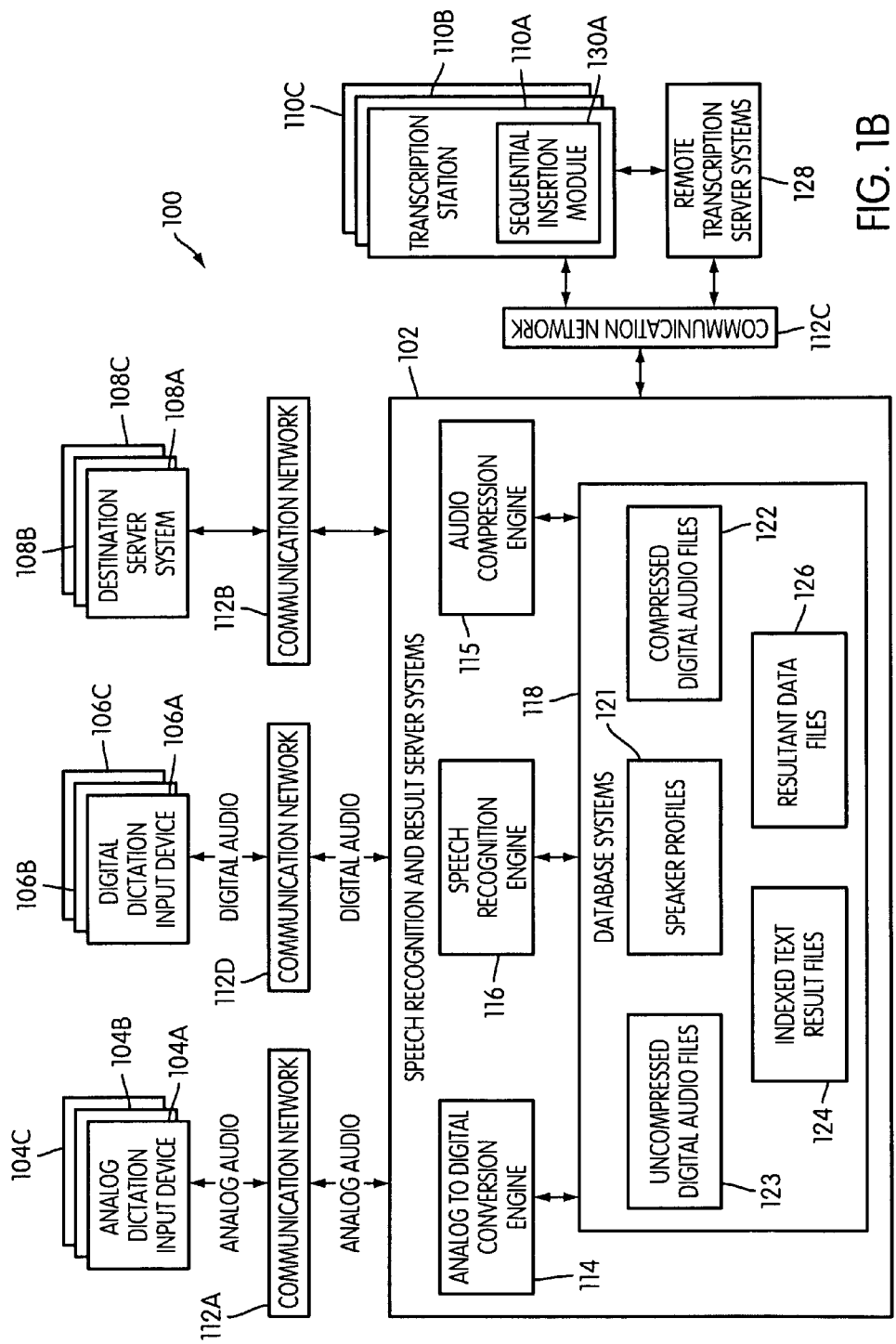
FIG. 1B is a block diagram of an embodiment for a sequential insertion transcription environment including a variety of systems connected through communication networks.
Figure 2:
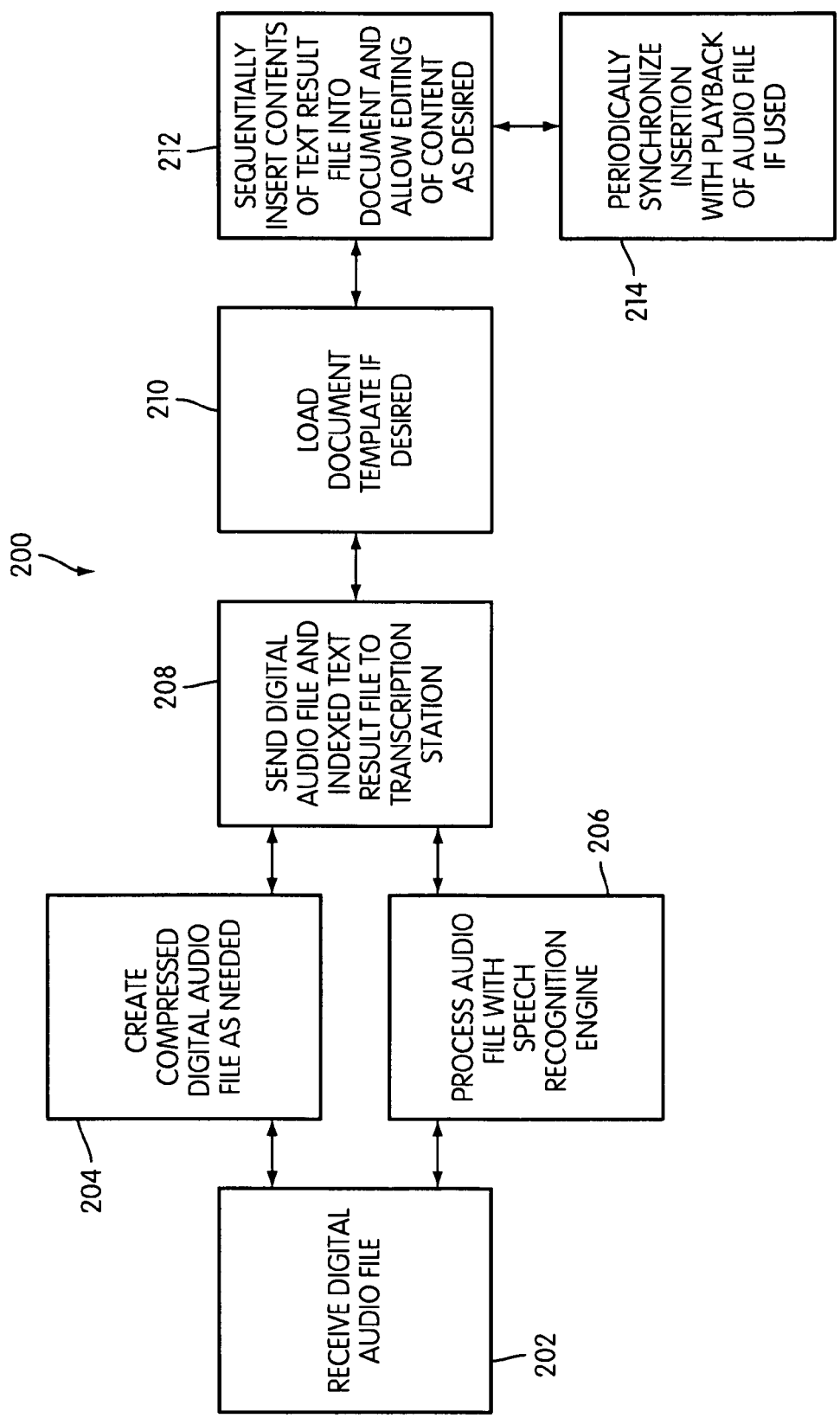
FIG. 2 is a block flow diagram of an embodiment for operations where compressed audio files and speech recognition results are utilized to generate resultant content through sequential insertion of the result information.
Figure 3:
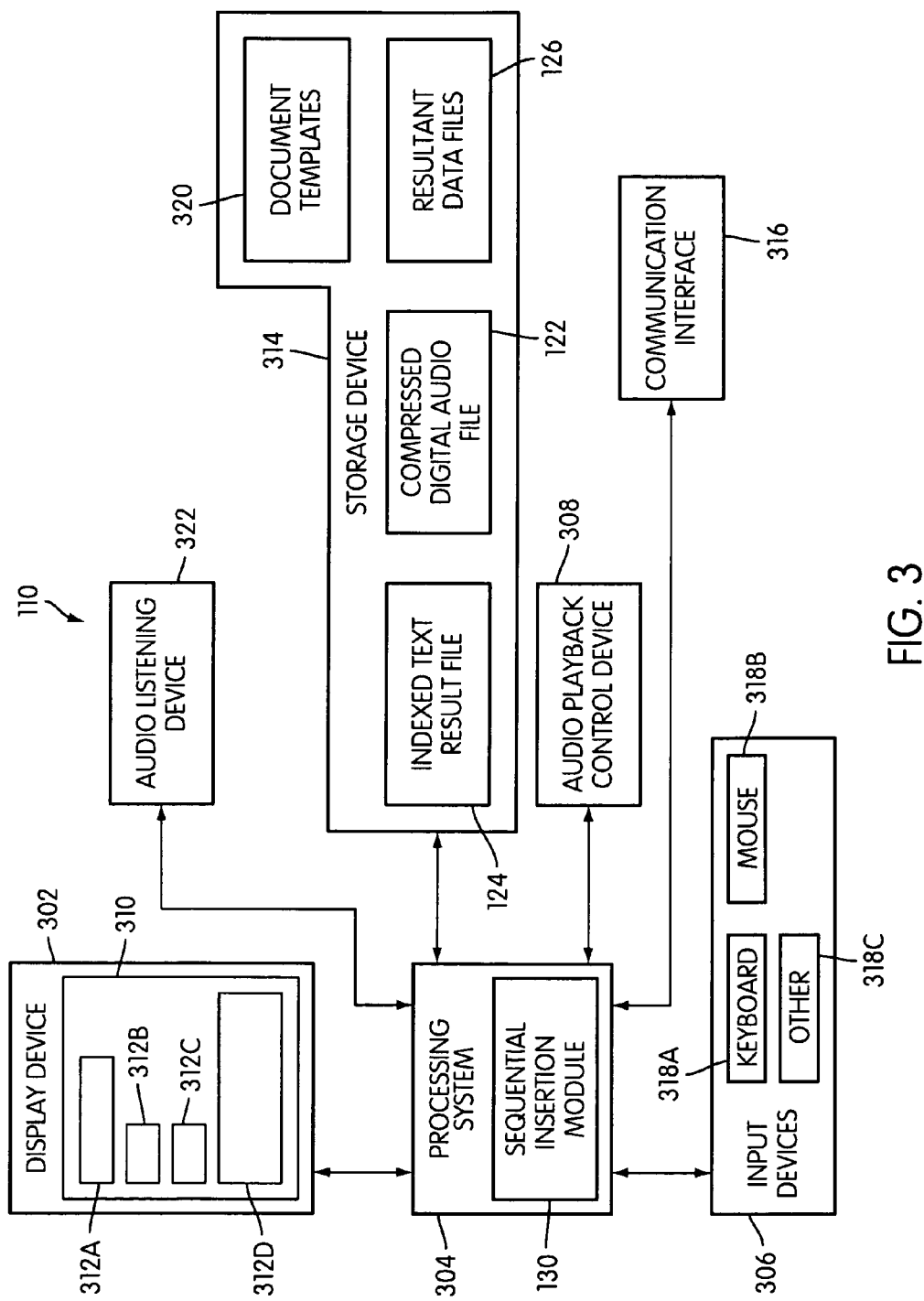
FIG. 3 is a block diagram of an embodiment for a transcription station including a processing system operating a sequential insertion module.
Figure 4:
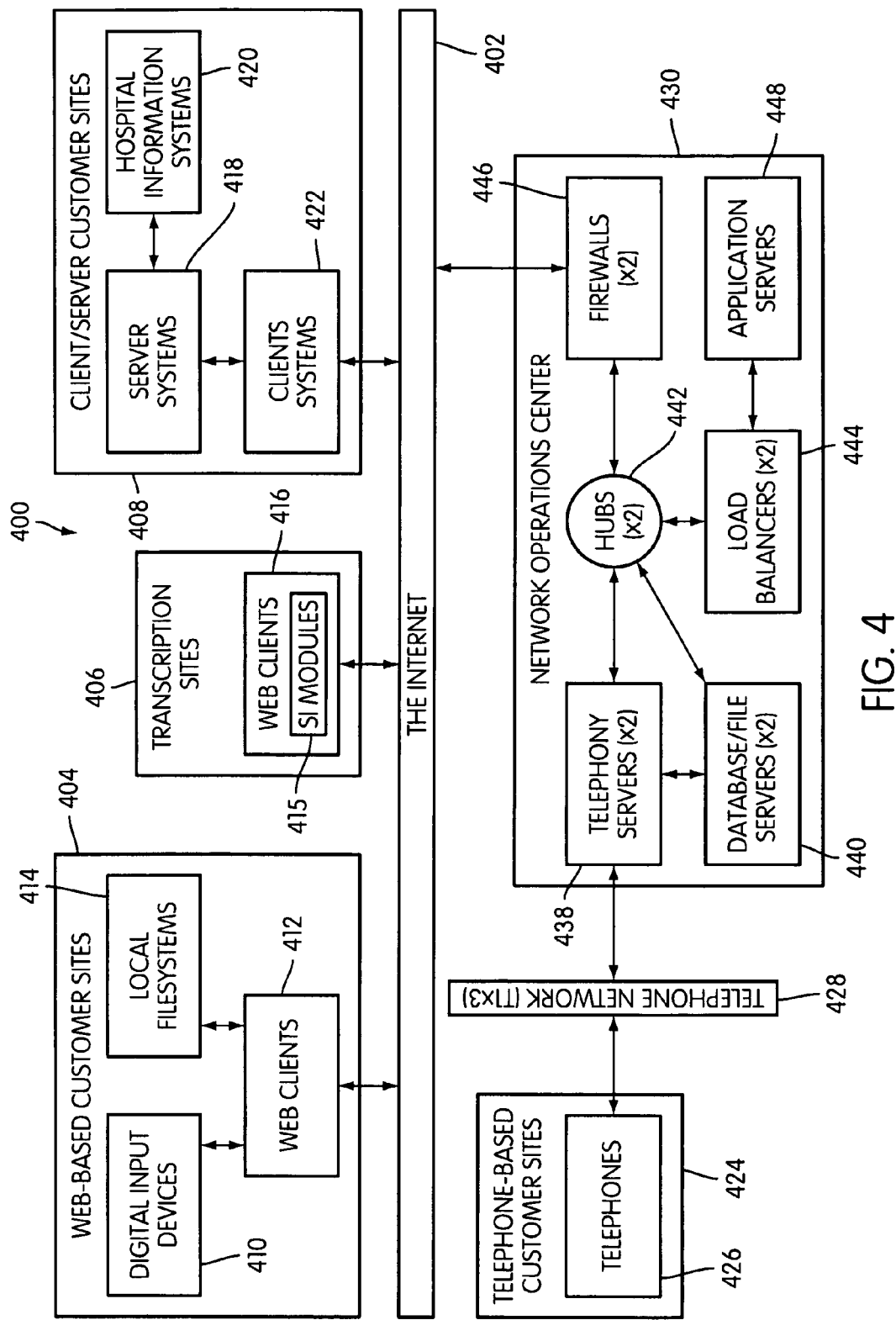
FIG. 4 is a block diagram of an embodiment for a medical transcription environment in which the sequential insertion module of the present invention can be utilized.
Figure 5:
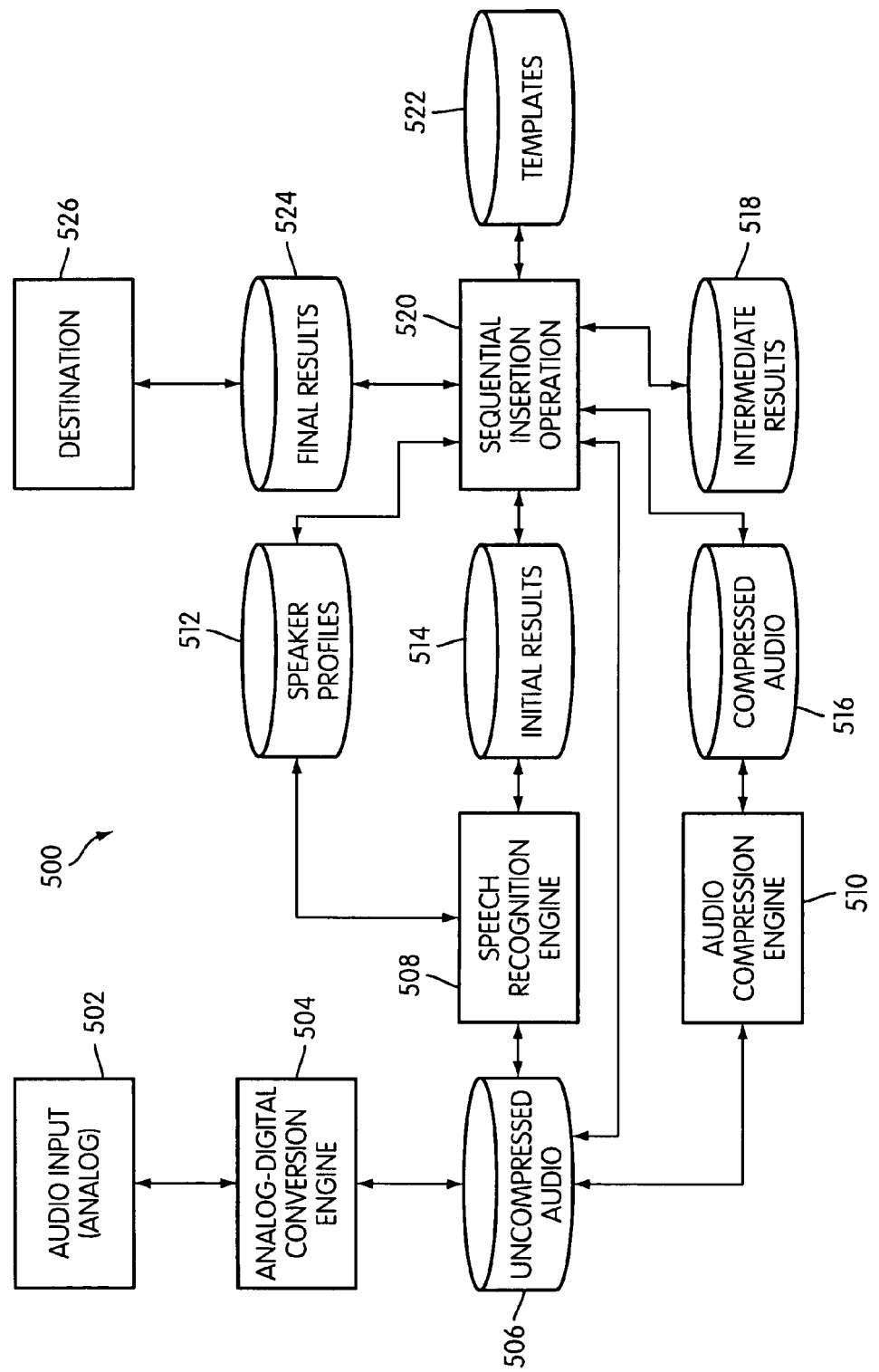
FIG. 5 is a block diagram for an additional embodiment for utilizing sequential insertion of speech recognition results.
Figure 6:
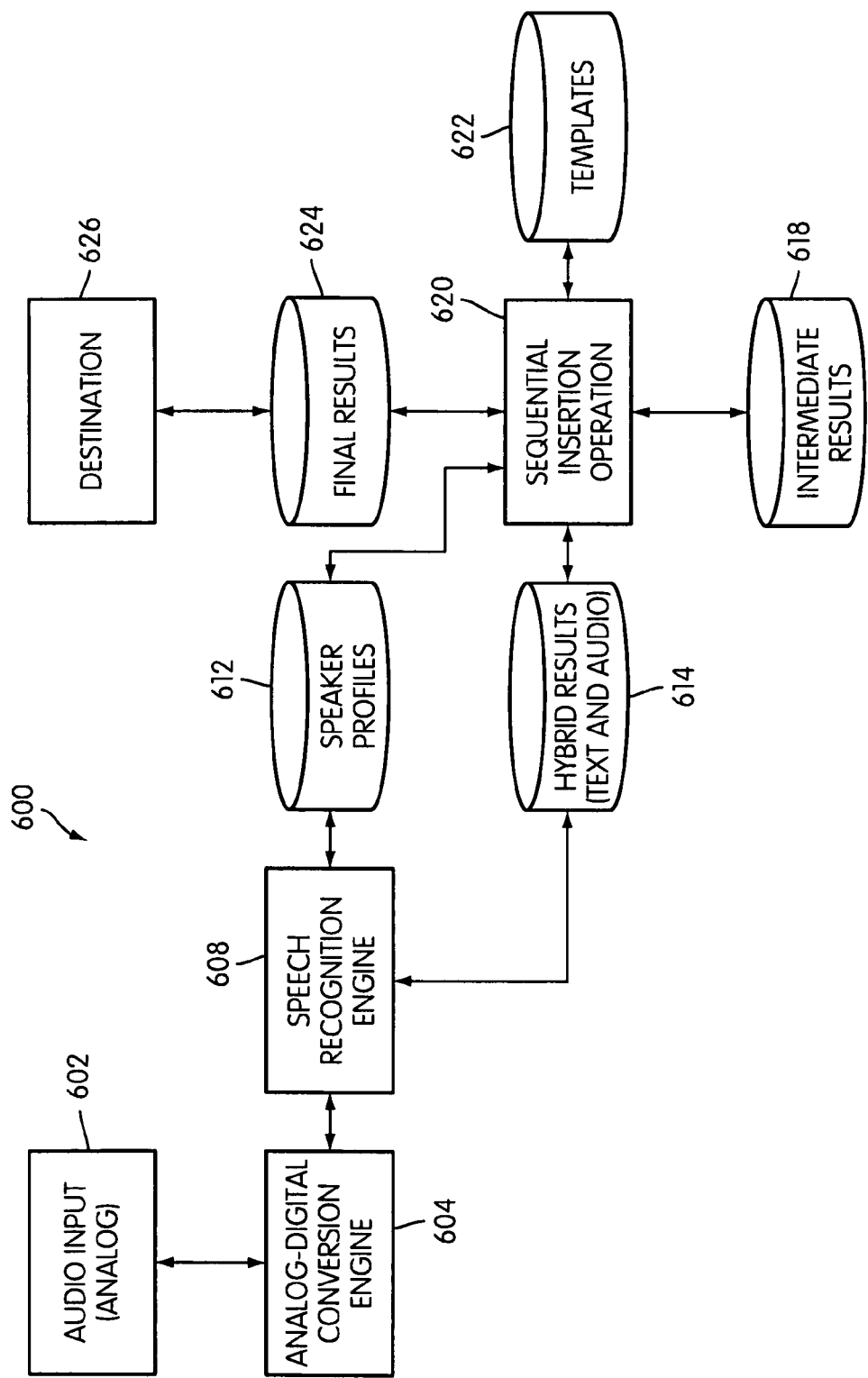
FIG. 6 is a block diagram for a additional embodiment for utilizing the sequential insertion of speech recognition results where the speech recognition results file is in a different format from a time-indexed text file.

FIG. 1B provides a block diagram of an embodiment for a transcription environment 100 in which voice dictation, speech recognition and deferred transcription are accomplished by different systems that are connected together through one or more communication networks. FIGS. 2-3 provide a flow diagram and a block diagram that describe in more detail the sequential insertion of speech recognition results for deferred transcription. FIG. 4 provides an additional embodiment for a medical transcription environment. And FIGS. 5-6 provide additional example implementations for the use of sequential insertion of speech recognition results.

Looking first to FIG. 1B, a deferred transcription environment 100 is depicted. In this embodiment, speech information is generated by a speaker through any one of a plurality of analog dictation input devices 104A, 104B, 104C, etc. and/or any one of a plurality of digital dictation input devices 106A, 106B, 106C etc. The analog dictation input devices 104A, 104B, 104C represent those devices, such as telephone or an analog (e.g., micro-cassette) recording device that is hooked up to a telephone line, that can provide analog audio information through communication network 112A to speech recognition and result server systems 102. This audio information can be converted to digital information through digital-to-analog conversion engine 114. Audio compression engine 115 can be used to compress digital audio information into compressed digital audio files. The compressed and uncompressed digital audio files can be stored as part of databases 122 and 123 within database systems 118. One example of the use of a dictation input device 104 would be remote dictation, such as where a speaker uses a telephone to call into the speech recognition and result server systems 102 which then stores and processes the audio speech information provided by the speaker. Other techniques and devices for providing analog audio information to server systems 102 could also be utilized, as desired. It is noted that the communication network 112A can be any network capable of connecting analog devices 104A, 104B and 104C. For example, this network 112A may include a telephone network that can be used to can communicate with end user telephone or analog systems.

The digital dictation devices 106A, 106B, 106C represent devices that provide digital audio information through communication network 112D to speech recognition and result server systems 102. This digital audio information generated by the digital dictation devices 106A, 106B, 106C can be compressed or uncompressed digital audio files, which can be communicated through network 112D and stored as part of databases 122 and 123 within database systems 118. In addition, if uncompressed digital audio files are generated by digital dictation devices 106A, 106B, 106C, these files could be compressed so that compressed digital audio files are communicated through the network 112D, thereby reducing bandwidth requirements. One example of a digital dictation device 106 would be dictation into a digital recorder or through a microphone connected to a computer such that the speech information is stored as a compressed or uncompressed digital audio file. This digital audio file can then be communicated by the digital recorder or computer through communication network 112D to the server systems 102 for further processing. The communication network 112D can be any variety of wired or wireless network connections through which communications can occur, and the communication network 112D can include the Internet, an internal company intranet, a local area network (LAN), a wide area network (WAN), a wireless network, a home network or any other system that provides communication connections between electronic systems.

The speech recognition and result server systems 102 represent a server-based embodiment for processing speech information for the purpose of deferred transcription services. The server systems 102 can be implemented, for example, as one or more computer systems with hardware and software systems that accomplish the desired analog or digital speech processing. As indicated above, the server systems 102 can receive speech information as analog audio information or digital audio information. In addition to being communicated through communication networks 112A and 112D, this audio information could also be provided to and loaded into the server systems in other ways, for example, through the physical mailing of analog or digital data files recorded onto a variety of media, such as analog tape, digital tape, CDROMs, hard disks, floppy disks or any other media, as desired. Once obtained, the information from this media can be loaded into the server systems 102 for processing. The analog-to-digital conversion engine 114 provides the ability to convert analog audio information into digital audio files, and the audio compression engine 115 provides the ability to compress digital audio files into compressed files. The speech recognition engine 116 provides the ability to convert digital audio information into text files that correspond to the spoken words in the recorded audio information and provide the ability to create time-index data associated with the spoken words. As noted above, in addition to time-indexed text files, other file formats may be used for the speech recognition results files, and different speech recognition engines currently use different result file formats. The database systems 118 represent one or more databases that can be utilized to facilitate the operations of the server systems 102. As depicted, database systems 118 include speaker profiles 121 that can be used by the speech recognition engine 116, compressed digital audio files 122, uncompressed digital audio files 123, indexed text result files 124, and resultant data files 126. The resultant data files 126 represent the transcribed and edited documents that result from the deferred transcription process.

To accomplish the deferred transcription of speech information, the embodiment depicted in FIG. 1B utilizes transcription stations 110A, 110B, 110C, etc. which are typically located at one or more remote transcription sites at geographic locations that are different from the geographic location for the speech recognition and result server systems 102. However, it is noted, that the server systems 102 and the transcription stations 110A, 110B and 110C could be located at the same geographic location as the server systems 102, if desired. The server systems 102 provides uncompressed and/or compressed digital audio files and indexed text result files to the transcription stations 110A, 110B and 110C through communication interface 112C. The transcription stations 110A, 110B and 110C include sequential insertion modules 130A, etc. that provide for the sequential insertion of the contents of the indexed text results, as discussed in more detail below. Remote transcription server systems 128 can also be utilized at each transcription site, if desired, to receive information from the server systems 102 and to communicate information to and from transcription stations 110A, 110B and 110C. The resultant documents created from the deferred transcription are communicated from the transcription stations 110A, 110B and 110C back to the server systems 102 through communication interface 112C. These resultant documents can be stored as part of the resultant data files database 126. It is noted that the speech recognition engine 116 could be implemented as part of the transcription stations 110A, 110B and 110C or as part of the remote transcription server systems 128, if such an implementation were desired.

The destination server systems 108A, 108B, 108C, etc. represent systems that ultimately receive the resultant documents or data from the deferred transcription process. If desired, these systems can be the same systems that are used to generate the audio information in the first place, such as digital dictation devices 106A, 106B, 106C, etc. These systems can also be other repositories of information. For example, in the medical transcription field, it is often the case that medical records or information must be dictated, transcribed and then sent to some entity for storage or further processing. The server systems 102, therefore, can be configured to send the resultant data files to the destination server systems 108A, 108B, 108C, etc. through the communication interface 112B. It is again noted that although FIG. 1B depicts the destination server systems 108A, 108B, 108C, etc. as separate systems within the environment 100, they can be combined with our portions of the environment 100, as desired.

As with communication interface 112D, communication interfaces 112B and 112C can be can be any variety of wired or wireless network connections through communications can occur, and the communication network 112A can include the Internet, an internal company intranet, a local area network (LAN), a wide area network (WAN), a wireless network, a home network or any other system that provides communication connections between electronic systems. It is also noted that communication systems 112B, 112C and 112D can represent the same network, such as the Internet, or can be part of the same network. For example, where each of these networks include the public Internet, then each of these communication networks are part of the same overall network. In such a case, all of the different systems within the environment 100 can communicate with each other. If desired, for example, the transcription stations 110A, 110B, 110C, etc. could communicate directly with the destination server systems 108A, 108B, 108C, etc. and/or with the dictation devices 104A, 104B, 104C, etc. and 106A, 106B, 106C, etc. In short, depending upon the implementation desired, the communication networks 112A, 112B, 112C and 112D can be set up to accommodate the desired communication capabilities.

FIG. 2 is a block flow diagram 200 of an embodiment for operations where audio files and speech recognition results are utilized to generate resultant content though sequential insertion of result information. In block 202, the digital audio files are received. In block 204, if desired or needed, a compressed digital audio file is generated. It is noted that if the compressed digital audio file from block 204 is to be used for synchronized playback with respect to the speech recognition results, the compressed digital audio file should be made time-true to the uncompressed audio file that is fed to the speech recognition engine in block 206. In block 206, the uncompressed audio files are processed with a speech recognition engine to generate result data, such as a time-indexed text file. It is further noted that compressed digital audio files can also be used for speech recognition processing, if desired.

Set forth below are portions of an example speech recognition result file that ahs been configured to be an XML-formatted time-indexed text file. The portions below are example excerpts from speech recognition results that could be created, for example, using the IBM VIAVOICE speech recognition engine. The recognized text below represents a portion of an example doctor's dictation of a medical record report or SOAP note, in which patient information is followed by sections having the headings Subjective, Objective, Assessment and Plan. SOAP notes and variations thereof are examples of well known medical reporting formats. Only portions of an example SOAP note report have been included below, and the "***" designation represent sections of the results that have been left out and would include additional information for the dictated report.

Within this example speech recognition results file, each word includes text information (TEXT) and time index information including a start time marker (STIME) and an end time marker (ETIME). For example, with respect to the work "Karen," the text is "Karen," the start time is "1810," and the end time is "2180." It is noted that the time index information is typically dependent upon the resolution provided by the speech recognition software. In the example below, the time index information is kept to the $1000^{th}$ a second. Thus, with respect to the word "Karen," the time lapsed for this word to be spoken is 0.370 seconds. It is noted that time-indexed results files, if utilized, can be of any desired format and resolution, as desired. Thus, it should be understood that the format below is included as only one example format for a time-indexed result file. It is again further noted that other speech recognition result file formats could also be used, such as results files that combine text and audio information, without departing form the sequential insertion feature of the present invention.

```
<?xml version="1.0" encoding="ISO-8859-1"?>
<VVRESULTS version="1.0">
  <HEADER>
    <TIME>2002-08-21 16:55:47</TIME>
    <USER>0000162</USER>
    <ENROLLID>0006</ENROLLID>
    <TASKID>ctelmdus</TASKID>
  </HEADER>
  <WORDS>
    <WORD>
      <TEXT>Karen </TEXT>
      <STIME>1810</STIME>
      <ETIME>2180</ETIME>
    </WORD>
    <WORD>
      <TEXT>Jones </TEXT>
      <STIME>2180</STIME>
      <ETIME>2670</ETIME>
    </WORD>
        ***
    <WORD>
      <TEXT>SUBJECTIVE </TEXT>
      <STIME>12400</STIME>
      <ETIME>13140</ETIME>
    </WORD>
    <WORD>
      <TEXT>Karen </TEXT>
      <STIME>14160</STIME>
      <ETIME>14490</ETIME>
    </WORD>
    <WORD>
      <TEXT>is </TEXT>
      <STIME>14490</STIME>
      <ETIME>14610</ETIME>
    </WORD>
    <WORD>
      <TEXT>an </TEXT>
      <STIME>14610</STIME>
      <ETIME>14670</ETIME>
    </WORD>
    <WORD>
      <TEXT>18</TEXT>
      <STIME>14670</STIME>
      <ETIME>15140</ETIME>
    </WORD>
    <WORD>
      <TEXT>-year-old </TEXT>
      <STIME>15140</STIME>
      <ETIME>15470</ETIME>
    </WORD>
    <WORD>
      <TEXT>female </TEXT>
      <STIME>15470</STIME>
      <ETIME>15920</ETIME>
    </WORD>
    <WORD>
      <TEXT>who </TEXT>
      <STIME>15920</STIME>
      <ETIME>15980</ETIME>
    </WORD>
    <WORD>
      <TEXT>came </TEXT>
      <STIME>15980</STIME>
      <ETIME>16230</ETIME>
    </WORD>
    <WORD>
      <TEXT>in </TEXT>
      <STIME>16230</STIME>
      <ETIME>16410</ETIME>
    </WORD>
    <WORD>
      <TEXT>for </TEXT>
      <STIME>16410</STIME>
      <ETIME>16670</ETIME>
    </WORD>
```

-continued

```
    <WORD>
      <TEXT>a possible </TEXT>
      <STIME>16670</STIME>
      <ETIME>17130</ETIME>
    </WORD>
    <WORD>
      <TEXT>pneumonia</TEXT>
      <STIME>17130</STIME>
      <ETIME>17660</ETIME>
    </WORD>
    <WORD>
      <TEXT>. </TEXT>
      <STIME>18520</STIME>
      <ETIME>18990</ETIME>
    </WORD>
        ***
    <WORD>
      <TEXT>she </TEXT>
      <STIME>151710</STIME>
      <ETIME>151900</ETIME>
    </WORD>
    <WORD>
      <TEXT>will </TEXT>
      <STIME>151900</STIME>
      <ETIME>152040</ETIME>
    </WORD>
    <WORD>
      <TEXT>RTC </TEXT>
      <STIME>152040</STIME>
      <ETIME>152600</ETIME>
    </WORD>
    <WORD>
      <TEXT>if </TEXT>
      <STIME>152600</STIME>
      <ETIME>152710</ETIME>
    </WORD>
    <WORD>
      <TEXT>not </TEXT>
      <STIME>152710</STIME>
      <ETIME>152870</ETIME>
    </WORD>
    <WORD>
      <TEXT>improved</TEXT>
      <STIME>152870</STIME>
      <ETIME>153350</ETIME>
    </WORD>
    <WORD>
      <TEXT>. </TEXT>
      <STIME>153350</STIME>
      <ETIME>153820</ETIME>
    </WORD>
  </WORDS>
</VVRESULTS>
```

It is noted that in the above example results file, time index information is associated with each word or group of words in the recognized speech text file. This time index data includes a start time and end time for this spoken word. In addition, there can be additional information within this results file, including header information that provides details such as speaker information, task IDs, user IDs, overall duration information for the recorded speech, and any other desired information. It is further noted that the time indexing could be provided on a per phrase basis, on a per sentence basis, on a per word basis, on a per syllable basis, or on any other time basis as desired. In addition, other time index formats, such as start position only, end position only, midpoint position only, or any other position information or combination thereof can be utilized as desired.

Looking back to FIG. 2, in block 208, the digital audio file and the indexed text result file are communicated to a transcription station. In block 210, a document template is loaded at the transcription station, if it is desired that a document template be utilized. If a document template is not loaded, then typically a blank document would be utilized by the transcriptionist. In block 212, the contents of the time-indexed text result file is sequentially inserted into the document such that a transcriptionist may edit and format the contents as they are inserted into the document. In block 214, the sequential insertion is periodically synchronized with the playback of the compressed audio file, if it used by the transcriptionist. Typically, it would expected that the transcriptionist would utilize audio playback to facilitate the editing of the recognized speech; however, the sequential insertion of the speech recognition contents could be utilized even if audio playback were not desired or if audio files were unavailable. It is further noted that the sequential insertion of the speech recognition contents can be utilized without a time-indexed result file. In other words, the time indexing could be removed from a speech recognition result file, and the plain text could be sequentially inserted without departing from the present invention.

Sequential insertion of the contents of a speech recognition results file according to the present invention provides a significant advantage over the current practice of delivering an entire text-only result file into a document at one time. This prior entire-result delivery technique creates a difficult and undesirable transcription environment. In contrast, sequential insertion can be accomplished by presenting the contents of the result file piece-by-piece so that the transcriptionist has time to consider each content piece independently and can better provide focused attention to this content piece as it is inserted into the document. This sequential insertion is particularly advantageous where time-indexed text result files are used in conjunction with audio playback devices that can be polled for elapsed time information with respect to audio files that the devices are playing back to the transcriptionist. By periodically polling the audio playback device and using the time-index data within the speech recognition results, the transcription station can synchronize the insertion of the contents of the speech recognition result file with the audio playback. And as stated above, this synchronization can be implemented in a variety of ways, as desired, such that the audio corresponding to the inserted words can be played back before the words are inserted, at the same time the words are inserted, or after the words are inserted, depending upon the implementation desired. In addition, as stated above, the amount of "lag" or "lead" between the audio playback and the insertion of the corresponding text can be adjustable, if desired, and this adjustment can be provided as an option to the transcriptionist, such that the transcriptionist can select the amount of "lag" or "lead" that the transcriptionist desires. In this way, the transcriptionist is seeing the contents of the result file in-time, or at some "lag" or "lead" time, with what the transcriptionist is hearing. Still further, this synchronization technique can allow for standard audio playback techniques to also control the sequential insertion thereby providing smooth speed, stop/start and other control features to the transcriptionist. The transcriptionist can then simply determine whether the inserted content matches the spoken content and edit it appropriately. Where document templates are utilized, the sequential insertion of the contents of the speech recognition results has even further advantageous. In particular, the sequential insertion technique allows the transcriptionist to position the cursor at the appropriate place in the template as the sequential insertion and audio playback are proceeding.

FIG. 3 is a block diagram of an embodiment for a transcription station 110 including a processing system 304 operating a sequential insertion module 130. Initially, it is noted that the sequential insertion module can be implemented as software code that can be transferred to the transcription station 110 in any desired fashion, including by communication from the server systems 102 through communication interface 112C, as depicted in FIG. 1B. This software code could be stored locally by the transcription station, for example, on storage device 314. The transcription station 110 can be implemented as a computer system capable of displaying information to a transcriptionist and receiving input from a transcriptionist. Although it is useful for the transcription station 110 to have local storage, such as storage device 314, it is possible for the transcription station 110 to simply use volatile memory to conduct all operations. In such a case, data would be stored remotely. As depicted in FIG. 3, in operation, the processing system 304 runs the sequential insertion module in addition to other software or instructions used by the transcription station 110 in its operations.

In the embodiment of FIG. 3, one or more input devices 306 are connected to the processing system 304. The input devices 306 may be a keyboard 318A, a mouse 318B or other pointing device, and/or any other desired input device. The transcription station 110 can also include a communication interface 316 that is connected to or is part of the processing system 304. This communication interface 316 can provide network communications to other systems, if desired, for example communications to and from the remote transcription server systems 128, as depicted in FIG. 1B. The transcription station 110 can also include an audio listening device 322 and audio playback control device 308 coupled to the processing system 304. The audio listening device 322 may be, for example, PC speakers or headphones. Where the transcription station 110 is a computer system, the audio playback control device 308 can be, for example, a foot controlled device that connects to a serial data port on the computer system. In addition, the transcription station 110 can include storage device 314, such as a hard disk or a floppy disk drive. The storage device 314 is also connected to the processing system 304 and can store the information utilized by the transcription station 110 to accomplish the deferred transcription of speech information. As shown in the embodiment of FIG. 3, this stored information includes the indexed text result file 124, the compressed digital audio file 122, document templates 316 and resultant data files 126. Although not shown, speaker profiles could also be stored locally and used or updated by the transcriptionist. The display device 302 represents the device through which the transcriptionist views the sequentially inserted speech recognition results and views edits made to the text. As depicted, the display is showing a document 310 that includes sections 312A, 312B, 312C and 312D which represent various desired input fields or areas within a document template. The sections 312A, 312B, 312C and 312D can be configured to have particular text and style formatting automatically set for the particular sections, as desired. This pre-formatting can be provided to facilitate the efficiency of creating a resultant document having information presented in a desired format.

The following provides an example of how sequential insertion with aligned audio playback, if utilized, would look and sound to a transcriptionist during operation utilizing the example speech recognition results set forth above. It is noted again that the "***" designation represents skipped portions of the speech recognition results. For example, if a standard SOAP note were being dictated, the standard Objective, Assessment and Plan fields would also exist in the resultant data file, as well as other information about the patient and the patient's condition. And it is further noted, as stated above, that the audio playback could be in-time with the insertion of the corresponding text, or could be at some "lag" or "lead" time with respect to the insertion of the corresponding text, as desired.

TABLE 1

SEQUENTIAL INSERTION EXAMPLE

| Time Index Data (1/1000 seconds) | Audio Playback (if utilized) | Sequentially Inserted Speech Recognition Results | Screen Contents with Likely Edits by Transcriptionist |
|---|---|---|---|
| 1810-2180 | Karen | Karen | Karen |
| 2180-2670 | Jones | Jones | Karen Jones |
| | | | *** |
| 12400-13140 | subjective | SUBJECTIVE | Karen Jones |
| | | | *** |
| | | | SUBJECTIVE: |
| | <silence> | <none> | Karen Jones |
| | | | *** |
| | | | SUBJECTIVE: |
| 14160-14610 | Karen | Karen | Karen Jones |
| | | | *** |
| | | | SUBJECTIVE: Karen |
| 14490-14610 | is | is | Karen Jones |
| | | | *** |
| | | | SUBJECTIVE: Karen is |
| 14610-14670 | an | an | Karen Jones |
| | | | *** |
| | | | SUBJECTIVE: Karen is an |
| 14670-15140 | eighteen | 18 | Karen Jones |
| | | | *** |
| | | | SUBJECTIVE: Karen is an 18 |
| 15140-15470 | year old | -year-old | Karen Jones |
| | | | *** |
| | | | SUBJECTIVE: Karen is an 18-year-old |
| 15470-15920 | female | female | Karen Jones |
| | | | *** |
| | | | SUBJECTIVE: Karen is an 18-year-old female |
| 15920-15980 | who | who | Karen Jones |
| | | | *** |
| | | | SUBJECTIVE: Karen is an 18-year-old female who |
| 15980-16230 | came | came | Karen Jones |
| | | | *** |
| | | | SUBJECTIVE: Karen is an 18-year-old female who came |
| 16230-16410 | in | in | Karen Jones |
| | | | *** |
| | | | SUBJECTIVE: Karen is an 18-year-old female who came in |
| 16410-16670 | for | for | Karen Jones |
| | | | *** |
| | | | SUBJECTIVE: Karen is an 18-year-old female who came in for |
| 16670-17130 | a possible | a possible | Karen Jones |
| | | | *** |
| | | | SUBJECTIVE: Karen is an 18-year-old female who came in for possible |
| 17130-17660 | pneumonia | pneumonia | Karen Jones |
| | | | *** |
| | | | SUBJECTIVE: Karen is an 18-year-old female who came in for possible pneumonia |
| | <silence> | N/A | Karen Jones |
| | | | *** |
| | | | SUBJECTIVE: Karen is an 18-year-old female who came in for possible pneumonia |
| 18520-18990 | period | | Karen Jones |
| | | | *** |
| | | | SUBJECTIVE: Karen is an 18-year-old female who came in for possible pneumonia. |
| | | | *** |
| 151710-151900 | she | She | Karen Jones |
| | | | *** |
| | | | SUBJECTIVE: Karen is an 18-year-old female who came in for possible pneumonia. |
| | | | *** |
| | | | She |
| 151900-152040 | will | will | Karen Jones |
| | | | *** |
| | | | SUBJECTIVE: Karen is an 18-year-old female who came in for possible pneumonia. |
| | | | *** |
| | | | She will |

TABLE 1-continued

SEQUENTIAL INSERTION EXAMPLE

| Time Index Data (1/1000 seconds) | Audio Playback (if utilized) | Sequentially Inserted Speech Recognition Results | Screen Contents with Likely Edits by Transcriptionist |
|---|---|---|---|
| 152040-152600 | RTC | RTC | Karen Jones<br>*<br>SUBJECTIVE: Karen is an 18-year-old female who came in for possible pneumonia.<br>* |
| 152600-152710 | if | if | She will RTC<br>Karen Jones<br>*<br>SUBJECTIVE: Karen is an 18-year-old female who came in for possible pneumonia.<br>* |
| 152710-152870 | not | not | She will RTC if<br>Karen Jones<br>*<br>SUBJECTIVE: Karen is an 18-year-old female who came in for possible pneumonia.<br>* |
| 152870-153350 | improved | improved | She will RTC if not<br>Karen Jones<br>*<br>SUBJECTIVE: Karen is an 18-year-old female who came in for possible pneumonia.<br>* |
| 153350-153820 | period | | She will RTC if not improved<br>Karen Jones<br>*<br>SUBJECTIVE: Karen is an 18-year-old female who came in for possible pneumonia.<br>*<br>She will RTC if not improved. |

As shown in the example set forth in TABLE 1 above, the audio playback and the sequential insertion are aligned. When audio playback is also utilized by the transcriptionist, the audio playback and sequential insertion can be aligned using the time index information to further facilitate the accurate and efficient transcription and correction of the speech recognition results. Thus, when the transcriptionist hears the word being spoken in the audio playback process the transcriptionist also sees the speech recognition results for the related time index. As discussed above, this sequential insertion of speech recognition results for deferred transcription provides significant advantages over prior techniques. This sequential insertion, as well as aligned audio playback, is even more advantageous when the resultant data file is desired to be formatted according to a particular document template. Such document templates in the medical transcription field include, for example, templates such as SOAP notes or other standard medical reporting formats.

FIG. 4 is a block diagram of an embodiment for a medical transcription environment 400 in which the sequential insertion module of the present invention can be utilized. As depicted, this medical transcription environment 400 is a web-based architecture that utilizes the Internet 402 for communicating information among the various components of the architecture. For example, one or more web-based customer sites 404, one or more client/server customer sites 408 and one or more telephone-based customer sites 424 can be connected to the Internet to communicate analog audio files, digital audio files and/or speech recognition results to the network operations center 430. One or more transcription sites 406 can also be connected to the Internet 402 to receive speech information from the network operations center 430 and provide back transcribed dictation result files utilizing sequential insertion modules 415 that run on one or more web clients 416.

The web-based customer sites 404 represent customer sites that are directly connected to the Internet through web clients 412. The web-based customer sites 404 can also include digital input devices 410 and local file systems 414. It is expected that these customers will communicate linear or compressed digital audio files, such as files in a standard WAV format, to the network operations center 430. It is noted that other configurations and communication techniques could be utilized, as desired.

The client/server customer sites 408 represent customers that have a one or more server systems 418 and one or more local client systems 422. These systems, for example, can allow for local speech recognition and related instantaneous correction to be conducted locally and stored centrally at the customer site. Thus, although it is likely that these client/server customers may have no need for deferred transcription and correction services and would only be retrieving resultant data files, it may be the case that these client/server customers will communicate speech recognition result files to the network operations center 430 for further processing. In addition, the client/server customer sites 408 can be configured to communicate information to one or more hospital information systems 420, or in the case where a client/server customer site 408 is hospital, then the hospital information system 420 would likely be local. It is noted that other configurations and communication techniques could be utilized, as desired.

The telephone-based customer sites 424 represent customers that desire to use telephones 426 to provide audio speech information to the network operations center 430. It is expected that telephones 426 would be connected to the network operations center 430 through a communication network 428 that would include a telephone network and one or more T1 type communication lines. For example, three (3) T1 lines could be used by the network operations center 430 to communicate through the telephone network to client telephones.

It is noted that the customer sites 404, 408 and 424 represent three basic types of customer sites. These customer sites can be located together or apart in one or more physical locations and can be configured in any variety of combinations. Further examples of customer site types and combinations are set forth below. It is noted that in these examples "input" refers to providing dictation information to the network operations center 430, and "retrieval" refers to obtaining transcribed and edited resultant data files from the network operations center 430.

1. Input-only site that uses digital input devices. This site would correspond to web-based customer site 404 without the local file systems 414.
2. Input-only site using the telephone. This site would correspond to a telephone-based customer site 424.
3. Input-only site using both digital input devices and the telephone. This site would be a combination of 1 and 2 above.
4. Retrieval-only site using a web client. This would correspond to a web-based customer site 404 without the digital input device box 410.
5. Retrieval-only site using MD Dictate PC, available from Expresiv Technologies. This would correspond to the client/server customer site 408 depicted in FIG. 4 where retrieval-only was desired.
6. Input and retrieval site using digital input devices and local file system. This would correspond to the web-based customer site 404 depicted in FIG. 4.
7. Input and retrieval site using telephone input devices and local file system. This would be combination of 2 and 4 above.
8. Input and retrieval site using digital input devices and MD Dictate PC. This would be a combination of 1 and 5.
9. Input and retrieval site using both digital input devices and the telephone and the local file system. This would be a combination of 2 and 6.
10. Input and retrieval site using both digital input devices and the telephone and MD Dictate PC. This would be a combination of 1, 2 and 5.

Typically, input-only and retrieval-only sites will be used in combination by a given entity. For example, input may be done at outlying facilities with retrieval of resultant data files occurring at a central facility. It is noted that alternative and modified combinations and architectures to those set forth above could be utilized as desired for generating speech information, for providing speech information for deferred transcription processing and for obtaining the transcribed and corrected results back after processing.

The network operations center 430 represents one or more systems that facilitate the deferred transcription of dictated information. The network operations center 430, for example, can process analog audio files, digital audio files and speech recognition results to provide speech information to the transcription sites 406. As depicted, the network operations center 430 includes two (2) firewall devices 446 that provide a security layer between the Internet 402 and the two (2) hubs 442. The hubs 442 also connect to two (2) telephony servers 438 that provide for connection to the telephone network, which can include T1 lines, represented by network 428.

Hubs 442 are also connected to two database and file servers 440 and two (2) load balancers 444. The load balancers 444 are in turn connected to two or more application servers 448. The database and file servers 440 can be configured to store the data that may be used for the deferred dictation services, such as uncompressed audio files, compressed audio files, speaker profiles, indexed-text speech recognition result files and resultant data files. The application servers 448 can be configured to provide processing tasks, such as speech recognition processing of audio files. Although not shown, the main network operations center 430 can also include one or more domain controllers that manage user permissions for direct (e.g., not browser-based) access to the various machines in the server racks.

The telephony servers 438 can be general servers configured to handle a large number of incoming telephone calls, to serve up prompts on the telephone and to perform analog-to-digital conversion as part of the recording process. The primary storage of uncompressed digital audio files received over the telephones can also be attached directly to the telephony servers 438 through a storage device that may be shared between two or more telephone server processing units. The database/file servers 440 are configured to form a redundant system and preferably include at least two processing units, with one of them serving file operations and with the other serving database operations. In addition, each of these processing units are preferably configured to be capable of taking over the other processing unit's function in case of a failure. In addition, the two or more processing units can share common storage, such as a single, large SCSI-RAID disk array storage unit. The contents of this storage unit can also be backed up periodically by a backup server and backup media. The application servers 448 can be a plurality of redundant blade servers, each of which is configured to perform any of a variety of desired functions, such as serving up web pages, compressing digital audio files, running speech recognition engines, and counting characters in each transcript for billing and payroll purposes. The load balancers 444 can be configured to direct traffic between the application servers 448 to help increase the responsiveness and throughput provided for high-priority tasks. It is noted that these system components are for example and that other and/or additional hardware architectures, system configurations, implementations, connections and communication techniques could be utilized, as desired.

In operation, as discussed above, speech information is sent from the customer sites 404, 408 and/or 424 to the network operations center 430 in the form of analog audio files, digital audio files, speech recognition results or other desired form. The network operations center 430 processes this speech information and provide speech recognition results and/or digital audio files to the web clients 416 at one or more transcription sites 406. The speech recognition results, as described above, can be XML-formatted time-indexed text files or other types of files that include text correlating to recognized speech recognized words. At the transcription sites 406, sequential insertion modules 415 running on local systems can be utilized to generate resultant data files, as discussed above. These resultant data files can then sent to the network operations center 430 for further processing. If desired, the resultant data files can be passed through quality assurance (QA) procedures, for example, by sending the resultant data file and the digital audio file to a QA specialist who checks the quality of the resultant data files and/or provides further editing of those files. Once the resultant data files have been finalized, they can be provided back to the customer sites 404, 408 and 424 or to some other destination server system, such as a hospital information system. It is noted that the resultant data files from the transcription sites 406, if desired, can be sent directly back to the customer sites 404, 408 and 424 or to some other destination server system rather than first going back to the network operations center 430. It is further noted that in the medical transcription context, the resultant data files will likely be created using a standard document template, such as the SOAP note format identified above.

FIG. 5 provides a block diagram for an additional embodiment 500 for utilizing sequential insertion of speech recognition results. The basic element can be represented by block 520 which provides for deferred correction of speech information utilizing sequential insertion of speech recognition results. Block 502 represents one example speech input in the form an analog audio input. This analog audio information can be converted to a digital audio file using an analog-to-digital conversion engine 504. Uncompressed digital audio files 506 can then be provided to blocks 508, 510 and 520. The audio compression engine 510 represents the use of compression to generate compressed audio files 516, if these are desired. Block 508 represents the speech recognition process that uses a speech recognition engine to analyze speech information and to create initial results 514 that represent the results of the speech recognition process. The speech recognition engine 508 can use speaker profiles 512 to facilitate the recognition of speech information. It is noted that rather than receive uncompressed digital audio files 506, the speech recognition engine 508 could also directly receive the output of the analog-to-digital conversion engine 504, could receive the output of a second analog-to-digital conversion engine that works in parallel with the analog-to-digital conversion engine 504 (e.g., where a computer system had one microphone connected to two sound cards with analog-to-digital conversion engines), or could receive the output of a second analog-to-digital conversion engine that received an analog input from an analog input device that works in parallel with the audio input 502 (e.g., where a computer system has two microphones connected to two separate sound cards with analog-to-digital conversion engines). It is further noted that other techniques and architectures could be used, as desired, to provide speech information to a speech recognition engine that then generates speech recognition results for that speech information.

Looking back to FIG. 5, the sequential insertion operation 520 uses the initial results 514 to facilitate the correction of the speech information. In so doing, the sequential insertion operation 520 can also use and update speaker profiles 512, compressed audio files 516 and document templates 522, if desired. During operations, the sequential insertion correction process 520 can generate intermediate result files 518 that are stored until the work is complete at which time final result files 514 are finalized. Block 526 represents the final destination for the final result files 524 generated by the deferred transcription and correction operations. It is noted that each of blocks 506, 512, 514, 516, 528, 522 and 524 represent data files that can be stored, as desired, using one or more storage devices, and these data files can be stored in multiple locations, for example, where initial speech recognition results files 514 are stored by a first system on a local storage device and then communicated through the Internet to a second system that then stores the speech recognition results files 514 on a second storage device. It is further noted, therefore, that the systems, storage devices and processing operations can be modified and implemented, as desired, without departing from the sequential insertion of speech recognition results according to the present invention.

FIG. 6 is a block diagram of another embodiment 600 for utilizing the sequential insertion of speech recognition results where the speech recognition results file is in a different format from a time-indexed text file. In this embodiment, the speech recognition result files are hybrid text/audio result files 614. Block 602 represents one example speech information input in the form of an analog audio input that can be converted to a digital audio file in block 604 using an analog-to-digital conversion engine. The speech recognition engine 608 processes this speech information and can use speaker profiles 612, if desired. As depicted, the speech recognition results in FIG. 6 are hybrid result files 614 that include text and the corresponding audio information within the same file. The sequential insertion operation 620 utilizes these hybrid result files 614 to create final result files 624. The sequential insertion operation 620 can also utilize and update speaker profiles 612, can utilize document templates 622 and can generate intermediate result files 618 as work is in progress. Block 626 represents the ultimate destination for the final result files 624. As described above, the systems, storage devices and processing operations can be modified and implemented, as desired, without departing from the sequential insertion of speech recognition results according to the present invention.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures for database processing. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method comprising:
   providing a pre-transcribed digital file comprising text data, the text data resulting from transcription of speech information;
   providing an electronic document template representing a desired format for a resultant document and including two or more input fields into which different portions of the digital file are to be inserted;
   receiving field selection input from a user, the field selection input defining one of the two or more input fields into which the digital file is to be inserted;
   sequentially inserting portions of the digital file into the selected field of the electronic document template, wherein sequentially inserting comprises automatically inserting contents of the text file into the electronic document template while enabling the user to control the sequential inserting by enabling the user to stop and then restart the automatic inserting of contents; and,
   generating the resultant document, the resultant document comprising at least some data sequentially inserted into the electronic document template.

2. The method of claim 1, wherein the electronic document template includes formatting for at least one input field of the document, such that when that input field is selected for insertion of a portion of the digital file, the formatting for that input field is automatically applied to the inserted portion.

3. The method of claim 1, further comprising:
providing a digital audio file representative of the speech information;
outputting the digital audio file to allow the user to hear the speech information related to the portions of the digital file being automatically inserted into the electronic document template; and
synchronizing the outputting of the digital audio file and the inserting.

4. The method of claim 3, wherein the outputting step and the automatically inserting step are synchronized such that the audio outputting is in-time with the insertion of corresponding text, lags behind the insertion of corresponding text by a time interval, or leads the insertion of corresponding text by a time interval.

5. The method of claim 4, further comprising, where the audio outputting lags behind or leads the automatic insertion of corresponding text, enabling the user to adjust the time interval between the audio outputting and the automatic insertion of the corresponding text.

6. The method of claim 1, wherein transcription of speech information is accomplished by utilizing speech recognition algorithms to convert speech information into digital text.

7. The method of claim 1, further comprising:
providing time-index data associated with the text data, the time-index data comprising time-index data associated with words within the digital file, and wherein automatic inserting contents comprises inserting into the electronic document template words associated with each time index one word at a time.

8. The method of claim 1, wherein transcription of speech information is done at a first geographic location, and sequential inserting is done at a second geographic location, and the first and second geographic locations are not the same.

9. The method of claim 1, further comprising, when the automatic inserting of contents is stopped by the user, enabling the user to edit inserted portions of the digital file within the electronic document template.

10. The method of claim 1, further comprising, when the automatic inserting of contents is stopped by the user, enabling the user to select a different one of the input fields into which desired subsequent portions of the digital file are to be inserted, to thereby cause the desired subsequent portions of the digital file to be automatically inserted into the different selected input field upon the restarting of the automatic inserting of contents.

11. The method of claim 1, wherein, while the inserting contents is proceeding, enabling the user to:
a) select a different one of the input fields into which desired subsequent portions of the digital file are to be automatically inserted, to thereby cause the desired subsequent portions of the digital file to be inserted into the different selected input field; and,
b) edit previously automatically inserted portions of the digital file within the electronic document template.

12. A computer system for generating data files that contain at least some transcribed speech information, comprising:
a display device;
a processor coupled to the display device;
an input device coupled to the processor to allow a user to edit information displayed on the display device;
a digital file comprising data representative of speech recognition results obtained through speech recognition processing on speech information;
an electronic document template viewable on the display device and representing a desired format for the resultant data file the electronic document template including two or more input fields into which different portions of the speech recognition results are to be inserted;
a sequential insertion module operable, utilizing the processor, to cause portions of the digital file to be sequentially inserted into one of the input fields of the electronic document template, wherein sequentially inserted comprises automatically inserting contents of the digital file into a selected field of the electronic document template while enabling the user to control the sequential insertion by:
1) enabling the user to stop the automatic inserting contents, and then select a different one of the input fields into which desired portions of the digital file are to be inserted, and then enable the user to restart the automatic inserting contents to thereby cause the desired portions of the digital file to be inserted into the different one of the input fields; and/or,
2) enabling the user to stop the automatic inserting contents, and then edit the inserted portion(s) of the digital file within the electronic document template, then restart the automatic inserting contents.

13. The computer system of claim 12, wherein the electronic document template includes default formatting for at least one input field of the data file, such that when an input field having associated default formatting is selected for automatic insertion of a portion of the digital file, the default formatting for that input field is automatically applied to the inserted portion.

14. The computer system of claim 12, further comprising:
a digital audio file representative of the speech information;
an audio listening device coupled to the processor; and
an audio output control device configured to be controlled by the user to control auditory output of the digital audio file and thereby to allow the user to hear speech information related to the portions of the digital file being automatically inserted into the electronic document template, the audio output control device being further configured to synchronize audio output of the digital audio file with the automatic insertion of the digital file.

15. The computer system of claim 14, wherein the audio output is synchronized to be in-time with the automatic insertion of corresponding text, to lag behind the insertion of corresponding text by a time interval, or to lead the automatic insertion of corresponding text by a time interval.

16. The computer system of claim 15, wherein, when the audio output lags behind or leads the automatic insertion of corresponding text, the time interval between the audio output and the automatic insertion of the corresponding text is adjustable.

17. The computer system of claim 14, wherein the digital file is generated at a first geographic location and communicated to the computer system at a second geographic location, and the first and second geographic locations are not the same.

18. The computer system of claim 17, wherein the digital file is communicated utilizing the Internet.

19. The computer system of claim 14, wherein the digital audio file comprises a compressed digital audio file.

20. A system for facilitating deferred transcription services, comprising:
a file server configured to store at least one digital audio file representing speech information;
a speech recognition module configured to analyze the digital audio file to produce a speech recognition result file; and an application server configured to execute the speech recognition module and communicate the speech recognition result file to a transcription station configured for sequential insertion of the speech recognition result file, to produce resultant documents representing transcribed speech information, wherein each of said transcription stations comprises:

a display device;

a processor coupled to the display device;

an input device coupled to the processor to allow editing of information displayed on the display device and control of the sequential insertion module;

an electronic document template viewable on the display device and representing a desired format for a resultant document and including two or more input fields into which different portions of the speech recognition result file may be inserted; and a sequential insertion module operable, utilizing the transcription station processor, to cause portions of the speech recognition results file to be sequentially inserted into the electronic document template, wherein sequentially inserted comprises automatically inserting contents of the speech recognition result file into a selected field of the electronic document template while enabling a user to control the automatic inserting by:

1) enabling the user to stop the automatic inserting contents and then edit the inserted portion(s) of the speech recognition result file within the electronic document template and then restart the automatic inserting contents; and/or, 3) enabling the user to stop that automatic inserting contents and then select a different one of the input fields into which desired subsequent portions of the speech recognition result file are to be automatically inserted, and then restart that automatic inserting contents, to thereby cause the desired subsequent portions of the digital file to be automatically inserted into the different selected input field.

21. The system of claim 20, further comprising a telephony server configured to receive analog speech information through a telephone network and to convert the analog speech information into digital audio files.

22. The system of claim 20, wherein the application server is further configured to receive digital audio files representing speech information through a communication network.

23. The system of claim 22, wherein the communication network comprises the Internet.

24. The system of claim 20, wherein the application sever is further configured to receive the resultant document back from the transcription stations.

25. The system of claim 24, wherein the file server is further configured to store the resultant document(s) and to provide customer access to the resultant document(s) through a communication network.

26. The system of claim 25, wherein the communication network comprises the Internet.

27. The system of claim 20, wherein the speech recognition result files comprise text and time index data associated with the text.

28. The system of claim 27, wherein the application server is further configured to send the digital audio file to the transcription stations, and wherein the transcription station is further configured to output the digital audio file in synchronization with sequential insertion.

29. The system of claim 20, wherein the application server comprises a plurality of server systems.

30. The system of claim 20, wherein the application server communicates with the transcription stations through the Internet.

31. A system comprising: at least one server configured to send a speech recognition result file a transcription station to thereby produce a resultant data file representing at least some transcribed speech information, wherein the transcription station comprises:

a display device;

a processor coupled to the display device;

an input device coupled to the transcription station processor to allow editing of information displayed on the display device and control of the sequential insertion module;

an electronic document template viewable on the display device and representing a desired format for the resultant data file and including two or more input fields into which different portions of the speech recognition result files are to be inserted; and a sequential insertion module operable, utilizing the processor, to cause portions of the speech recognition result file to be sequentially inserted into a selected field of the electronic document template, wherein sequentially inserting comprises automatically inserting contents of the text file into a selected the electronic document template while enabling a user to control that automatic inserting by enabling the user to stop that automatic inserting of contents, and while stopped, enabling the user to:

(1) resume the automatic inserting of contents; and, (2) either or both of:

(a) select a different one of the input fields into which desired portions of the speech recognition results are to be automatically inserted to thereby cause the desired portions of the speech recognition results to be automatically inserted into the selected input field; and, (b) edit the previously automatically inserted contents within the electronic document template.

32. The server system of claim 31, wherein the server is further configured to receive the resultant data files back from the transcription station.

33. The server system of claim 32, wherein the server communicates with the remote transcription stations through the Internet.

34. The server system of claim 31, wherein the speech recognition result file comprises text and time index data associated with the text.

35. The system of claim 34, wherein the server is further configured to send digital audio files to the transcription stations, wherein the transcription stations are further configured to output the digital audio file in synchronization with automatic insertion of a corresponding speech recognition results file.

36. A method for generating an electronic document, at least some portions of which come from a transcribed data file of speech information, the method comprising:

generating a digital file comprising data representative of speech recognition results obtained through speech recognition processing on speech information;

sequentially inserting portions of the digital file into the electronic document;

providing an audio file representative of the speech information;

outputting the audio file to allow the user to hear speech information related to the portions of the digital file being sequentially inserted into the electronic document;
synchronizing the outputting and the sequentially inserting;
storing the resultant data file in a format that will permit the resultant data file to be viewed electronically or printed,
wherein sequentially inserting comprises automatically inserting the digital file into particular fields within the electronic document and at least allowing the user to selectively stop both the automatic inserting step and the outputting step to allow the user to edit at least some inserted portions within the electronic document, and then enabling the user to resume the automatic inserting and the outputting after editing selected inserted portions.

37. The method of claim 36, wherein the synchronization is such that that the audio outputting is in-time with the automatic insertion of corresponding text, lags behind the automatic insertion of corresponding text by a time interval, or leads the automatic insertion of corresponding text by a time interval.

38. A computer system for generating transcribed data files of speech information, comprising:
a display device;
a processor coupled to the display device;
an input device coupled to the processor to allow editing of information displayed on the display device;
a digital file comprising data representative of speech recognition results obtained through speech recognition processing on speech information;
an audio file representative of the speech information,
a sequential insertion module operable, utilizing the processor, to cause portions of the digital file to be automatically inserted into a selected document field and viewable on the display device; and
an audio output control device configured to be controlled by the user to control audio output of the audio file and thereby to allow the user to hear speech information related to the portions of the digital file being automatically inserted into the document, the audio output control device being further configured to synchronize audio output of the audio file with sequential insertion of the digital file,
wherein the automatic insertion functionality of the sequential insertion module may be controlled by the user such that the user may:
(1) selectively stop automatically insertion and audio output of the audio file to thereby allow the user to edit the inserted portions within the document, as needed, as the portions are automatically inserted into the document; and
(2) enable the user to resume the automatic insertion and audio output after editing the selected inserted portions.

39. The system of claim 38, wherein the audio output is synchronized to be in-time with the automatic insertion of corresponding text, to lag behind the insertion of corresponding text by a time interval, or to lead the automatic insertion of corresponding text by a time interval.

* * * * *

UNITED STATES PATENT AND TRADEMARK OFFICE
CERTIFICATE OF CORRECTION

PATENT NO. : 7,444,285 B2 Page 1 of 1
APPLICATION NO. : 10/313353
DATED : October 28, 2008
INVENTOR(S) : Joseph S. Forbes It is certified that error appears in the above-identified patent and that said Letters Patent is hereby corrected as shown below:

Column 3
Line 51, delete "diagram for a" and insert -- diagram for an -- therefor.

Column 8
Line 60, delete "a second" and insert -- of a second -- therefor.

Column 11
Line 8, delete "would expected" and insert -- would be expected -- therefor.

Column 23
Line 31, Claim 20, delete "3)" and insert -- 2) -- therefor.
Line 48, Claim 24, delete "sever" and insert -- server -- therefor.

Column 25
Line 19, Claim 37, delete "that that" and insert -- that -- therefor.

Column 26
Line 1, Claim 38, delete "information," and insert -- information; -- therefor.
Line 17, Claim 38, delete "automatically" and insert -- automatic -- therefor.

Signed and Sealed this

Third Day of March, 2009

JOHN DOLL
*Acting Director of the United States Patent and Trademark Office*